(12) United States Patent
St-Pierre

(10) Patent No.: US 9,454,554 B1
(45) Date of Patent: Sep. 27, 2016

(54) VIEW DEPENDENT QUERY OF MULTI-RESOLUTION CLUSTERED 3D DATASET

(75) Inventor: Mathieu St-Pierre, Ste-Brigitte de Laval (CA)

(73) Assignee: BENTLEY SYSTEMS, INCORPORATED, Exton, PA (US)

(*) Notice: Subject to any disclaimer, the term of this patent is extended or adjusted under 35 U.S.C. 154(b) by 984 days.

(21) Appl. No.: 13/106,600

(22) Filed: May 12, 2011

(51) Int. Cl.
| | |
|---|---|
| G06F 17/00 | (2006.01) |
| G06F 17/30 | (2006.01) |
| G06F 3/0481 | (2013.01) |
| G06T 15/00 | (2011.01) |
| G09G 5/391 | (2006.01) |
| G06T 9/20 | (2006.01) |

(52) U.S. Cl.
CPC ..... *G06F 17/30327* (2013.01); *G06F 3/04815* (2013.01); *G06T 9/20* (2013.01); *G06T 15/00* (2013.01); *G09G 5/391* (2013.01)

(58) Field of Classification Search
CPC ............. G06T 17/005; G06T 2210/36; G06T 2207/20016; G06T 9/20; G06T 15/20; G06T 17/20; G06T 17/00; G06T 17/10; G06T 7/2033; G06F 17/30327; G06F 17/00
USPC .......................................................... 345/421
See application file for complete search history.

(56) References Cited

U.S. PATENT DOCUMENTS

| | | | |
|---|---|---|---|
| 5,923,330 A * | 7/1999 | Tarlton et al. ................ 345/419 |
| 5,966,133 A | 10/1999 | Hoppe | |
| 6,426,750 B1 | 7/2002 | Hoppe | |
| 7,336,851 B1 | 2/2008 | Cote | |
| 2004/0176908 A1* | 9/2004 | Senda et al. .................. 701/211 |
| 2008/0238919 A1* | 10/2008 | Pack ............................. 345/420 |

OTHER PUBLICATIONS

De Floriani, Leila, and Paola Magillo. "Multiresolution mesh representation: Models and data structures." Tutorials on Multiresolution in Geometric Modelling. Springer Berlin Heidelberg, 2002. 363-417.*
Meredith, Jeremy, and Kwan-Liu Ma. "Multiresolution view-dependent splat based volume rendering of large irregular data." Parallel and Large-Data Visualization and Graphics, 2001. Proceedings. IEEE 2001 Symposium on. IEEE, 2001.*

(Continued)

*Primary Examiner* — Mark Zimmerman
*Assistant Examiner* — Sarah Le
(74) *Attorney, Agent, or Firm* — Cesari and McKenna, LLP; James A. Blanchette

(57) ABSTRACT

In one embodiment, data of a data set that describes the topography of a three-dimensional surface (e.g., a DTM) is obtained at a resolution appropriate for visualization on a display screen. The data is organized into a number of resolutions by spatial indexing. A lowest resolution cluster of data is selected. For any visible data in the selected cluster of data for a type of visualization to be shown on the display screen, a point density in a coordinate system of the display screen resulting from data is compared to a configured threshold. If the point density in the display screen's coordinate system is below the configured threshold, visible data in the selected cluster of data is returned for display. If the point density in the display screen's coordinate system is above the configured threshold, one or more next-higher resolution clusters of data are selected, and the technique repeated.

18 Claims, 8 Drawing Sheets

(56) References Cited

OTHER PUBLICATIONS

Wiley, Charles, et al. "Multiresolution BSP trees applied to terrain, transparency, and general objects." Graphics Interface. vol. 97. 1997.*

De Floriani, Leila, Paola Marzano, and Enrico Puppo. "Multiresolution models for topographic surface description." The Visual Computer 12.7 (1996): 317-345.*

"Bentley Descartes V8i (SELECTseries 2) Help," Bentley Systems, Incorporated, Feb. 2011, pp. 1-53.

"ArcGIS 9.2 Desktop Help," ESRI, Jul. 20, 2006, pp. 1-47.

Lindstrom, Peter, et al., "Real-Time, Continuous Level of Detail Rendering of Height Fields," Proceedings of SIGGRAPH 96 Conference (1996), pp. 109-118.

De Boer, Willem, "Fast Terrain Rendering Using Geometrical MipMapping," E-mersion Project, http://www.connectii.net/emersion, Oct. 2000, pp. 1-7.

Strugar, Filip, Continuous Distance-Dependent Level of Detail for Rendering Heightmaps (CDLOD), *Journal of Graphics, GPU and Game Tools*, http://jgt.akpeters.com/papers/Strugar10/, Jul. 11, 2010, pp. 1-15.

Xu, Kai, et al., "Direct Mesh: A Multiresolution Approach to Terrain Visualization," IEEE Computer Society, Data Engineering, 2004, Proceedings, 20th International Conference, Mar. 30-Apr. 2, 2004, pp. 1-11.

Kraus, Karl, et al., "DMT Modelling and Visualization—The SCOP Approach," Photogrammetric Week 05, Wichmann Verlag, Heidelberg, 2005, pp. 241-252.

Pajarola, Renato, et al., "Efficient Implementation of Real-Time View-Dependent Multiresolution Meshing," IEEE Computer Society, IEEE Transactions on Visualization and Computer Graphics, vol. 10, No. 3, May/Jun. 2004, pp. 1-20.

Schneider, Jens, "GPU-Friendly High-Quality Terrain Rendering," Journal of WSCG, vol. 14, 2006, pp. 1-8.

Yusov, Egor, et al., "GPU-optimized Efficient Quad-Tree Based Progressive Multiresolution for Interactive Large Scale Terrain Rendering," Proceedings of GraphiCon'2007, Moscow, Russia, www.graphicon.ru/2007/proceedings/Papers/Paper_13.pdf, Jun. 23-27, 2007. pp. 1-8.

Yusov, Egor, et al., "JPEG2000-based Compressed Multiresolution Model for Real-time Large-scale Terrain Visualization," Proceedings of GraphiCon'2008, Moscow, Russia, www.graphicon.ru/2008/proceedings/English/S8/Paper_1.pdf, Jun. 23-27, pp. 1-8.

Tsai, Fuan, et al., "Progressive Streaming and Rendering of 3D Terrain for Cyber City Visualization," Proceedings on ACRS2006, www.a-a-r-s.org/acrs/proceeding/ACRS2006/Papers/C-1_C1.pdf, Asian Association on Remote Sensing, 2006, pp. 1-6.

Rottger, Stefan, et al., "Real-Time Generation of Continuous Levels of Detail for Height Fields," University of Erlangen-Nuremberg, Jul. 31, 1998, pp. 1-8.

De Floriani, Leila, et al., "Regular and Irregular Multi-Resolution Terrain Models: A Comparison," Proceeding on GIS '02, Proceedings of the 10th ACM International Symposium on Advances in Geographic Information Systems, ACM, New York, New York, 2002, pp. 1-6.

Cline, David, "Terrain Decimation Through Quadtree Morphing," IEEE Transactions on Visualization and Computer Graphics, vol. 7 Issue 1, Jan. 2001, IEEE Educational Activities Department Piscataway, NJ, USA, Jan. 2001, pp. 1-7.

Kanellopoulos, Ioannis, et al., "Visualisation of Geographic Information in a Dynamic 3-Dimensional Environment," Geoscience and Remote Sensing Symposium, 2001. IGARSS '01. IEEE 2001 International, Sydney, NSW, Australia, Jul. 9, 2001-Jul. 13, 2001, pp. 1-8.

Lindstrom, Peter, et al., "Visualization of Large Terrains Made Easy," U.S. Department of Energy, Lawrence Livermore National Laboratory, Aug. 7, 2001, pp. 1-11.

* cited by examiner

VIEW DEPENDENT QUERY OF MULTI-RESOLUTION CLUSTERED 3D DATASET

BACKGROUND

1. Technical Field

The present disclosure relates to techniques for obtaining data for display from a data set at a resolution appropriate for visualization, including, in one embodiment, techniques for obtaining data from a multi-resolution data set descriptive of a three-dimensional surface, such as a digital terrain model (DTM), at a resolution appropriate for visualization.

2. Background Information

Often a three-dimensional surface may be represented by a data set that describes its topography. Such a data set may be constructed from punctual measurements that describe a height of the surface at discrete points. For example, where the three-dimensional surface is terrain, a digital terrain model (DTM) may be used to represent the topography of the terrain. Such a DTM may be constructed from punctual elevation measurements of the terrain that describe elevation at discrete points. Some DTMs may include data descriptive of the ground's surface as well as above-ground objects (e.g., buildings, bridges, cars, trees, etc.). Other DTMs may only include data descriptive of the ground's surface, and exclude above-ground objects. The punctual elevation measurements used to create a DTM may be obtained via any of a variety of surveying and measurement techniques. For example, Light Detection and Ranging (LIDAR), stereo photogrammetry from aerial surveys, real time kinematic global positioning, as well as other surveying and measurement techniques may be used in creation of a DTM.

A data set that describes the topography of three-dimensional surface, such as a DTM that describes the topology of terrain, may be stored using a variety of data structures. One popular data structure for storing a data set, such as a DTM, is a raster. In contrast to rasters used in raster graphics, where each position in a matrix typically includes a color measurement for a corresponding pixel in an image, in a raster used with a DTM, positions in a matrix typically include an elevation measurement for a corresponding point in the terrain. Such a raster may be small (e.g., include elevation measurements for only a few thousand points) or large (e.g., include elevations measurements for billions of points). Indeed, large DTMs have become increasingly prevalent due to advances in the surveying and measurement techniques used to collect the underlying punctual elevation measurements.

A data set that describes the topography of a three-dimensional surface may be used for a variety of different purposes. For example, a DTM that describes the topology of terrain may be used for water flow analysis, volume calculations, realistic three-dimensional visualization, artistic presentation, as well as a variety of other purposes. Many of the uses, however, require the data set (e.g., DTM) to be represented as a solid surface, rather than as a series of discreet points. As such, a data set (e.g. DTM) that is stored as a raster may be triangulated so that, instead of being represented as a series of discrete points, it is represented in as a triangle mesh, the triangles interconnected to each other to form a solid surface. A DTM that is represented as a triangle mesh is referred to herein as a "triangulated DTM." FIG. 1 is an illustration of an example triangulated DTM 100 (the DTM data courtesy of Ville De Québec).

A user will often desire to view a portion of a data set that describes the topography of a three-dimensional surface (e.g., a DTM) on a display screen of an electronic device using a computer aided design (CAD) application or other software. Typically, the CAD application interprets the information in the data set as simple geometry and sends all such geometry for the view to be displayed to a graphics subsystem for rendering. This simple geometry is converted by the graphics subsystem into pixels for display on the display screen. However, problems develop when the number of points in the geometry approaches the number of pixels (i.e., the screen resolution) of the display screen. For example, should a user try to view a portion of a triangulated DTM that contains 920918 points, on a screen that has a resolution of 1,310,720 pixel (1280 pixels by 1024 pixels), so many points may be loaded that the resulting image appears almost completely solid (e.g., white). That is, the CAD application may be attempting to display so much data that, given the screen resolution, the resulting image becomes almost entirely useless.

The task of creating a meaningful display from a data set that describes the topography of a three-dimensional surface (e.g. a DTM) may be complicated by a variety of factors. Very large data sets may be arranged into various "levels of detail", such that there are multiple representations of data at various resolutions. A data set that describes the topography of a three-dimensional surface with multiple representations of data at various resolutions is referred to herein as a "multi-resolution data set", and, more specifically, a DTM that describes the topography of terrain with multiple representations of data at various resolutions is referred to herein a "multi-resolution DTM". The data of a multi-resolution data set (e.g., a multi-resolution DTM) may be represented two-and-a-half-dimensionally (i.e., in 2.5D) where there is a unique Z-axis value for a given X/Y location).

Further complicating issues, the data of a data set that describes the topography of a three-dimensional surface (e.g., a DTM) may be non-uniformly distributed over the area represented and may have a non-uniform density. Still further, the data may have an irregular (e.g., non-rectangular) shape. These and other issues make meaningful display from a data set even more complicated.

What is needed is an improved technique for obtaining data from a data set that describes the topography of a three-dimensional surface (e.g., a DTM) at a resolution appropriate for visualization.

SUMMARY

In one embodiment, the shortcomings of the prior art are addressed by a novel view-dependent query process that obtains data from a data set that describes the topography of a three-dimensional surface (e.g., a DTM) at a resolution appropriate for visualization on a display screen. The data set may be a multi-resolution data set, having data organized into a number of resolutions by spatial indexing, where each node of a plurality of nodes of a spatial index corresponds to a cluster of data of the data set at a corresponding resolution. In one implementation, the view-dependent query process employs a generic approach. A lowest resolution cluster of data is selected from the spatial index. For any visible data in the cluster of data for a type of visualization to be shown on the display screen, a point density in a coordinate system of the display screen resulting from data at the resolution is compared to a configured threshold. If the point density in the display screen's coordinate system is below the configured threshold, the resolution of the cluster of data is considered appropriate for visualization on the display screen, and the visible data in the cluster of data is returned for display on the display screen. If the point density in the display screen's coordinate system is above the configured threshold, one or more next-higher resolution clusters of data are selected from the spatial index, and the technique is repeated for the one or more next higher resolution clusters of data. The technique repeats for successively next-higher resolution cluster(s) of data from the spatial index until the point density in the display screen's coordinate system is below the configured threshold or there is no next-higher resolution cluster(s) of data, in which case the highest resolution cluster(s) of data are returned for display on the display screen. Thereby, data from the data set that describes the topography of a three-dimensional surface (e.g., a DTM) may be obtained at a resolution appropriate for visualization that is dependent of the number of punctual measurements and the desired point of view and any perspective effects applied to that view.

As described below, various other embodiments may be implemented, that make certain additional improvements upon the generic approach. In one such alternative embodiment, a "camera-specific" approach may be employed that employs differing operations for affine visualizations and projective visualizations to achieve certain additional benefits.

BRIEF DESCRIPTION OF THE DRAWINGS

The detailed description below refers to the accompanying drawings of example embodiments, of which.

DETAILED DESCRIPTION

Figure 1:
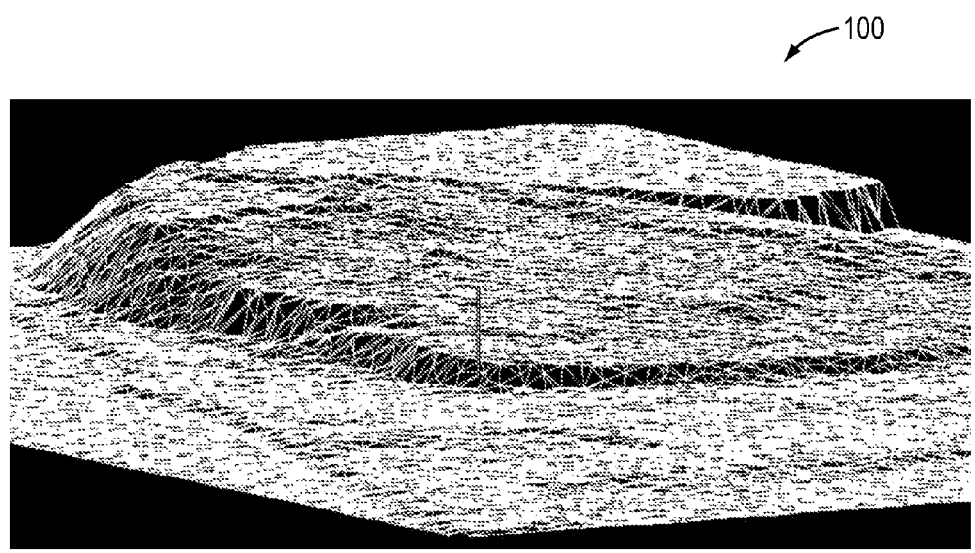
FIG. 1 is an illustration of an example triangulated DTM.
Figure 2:
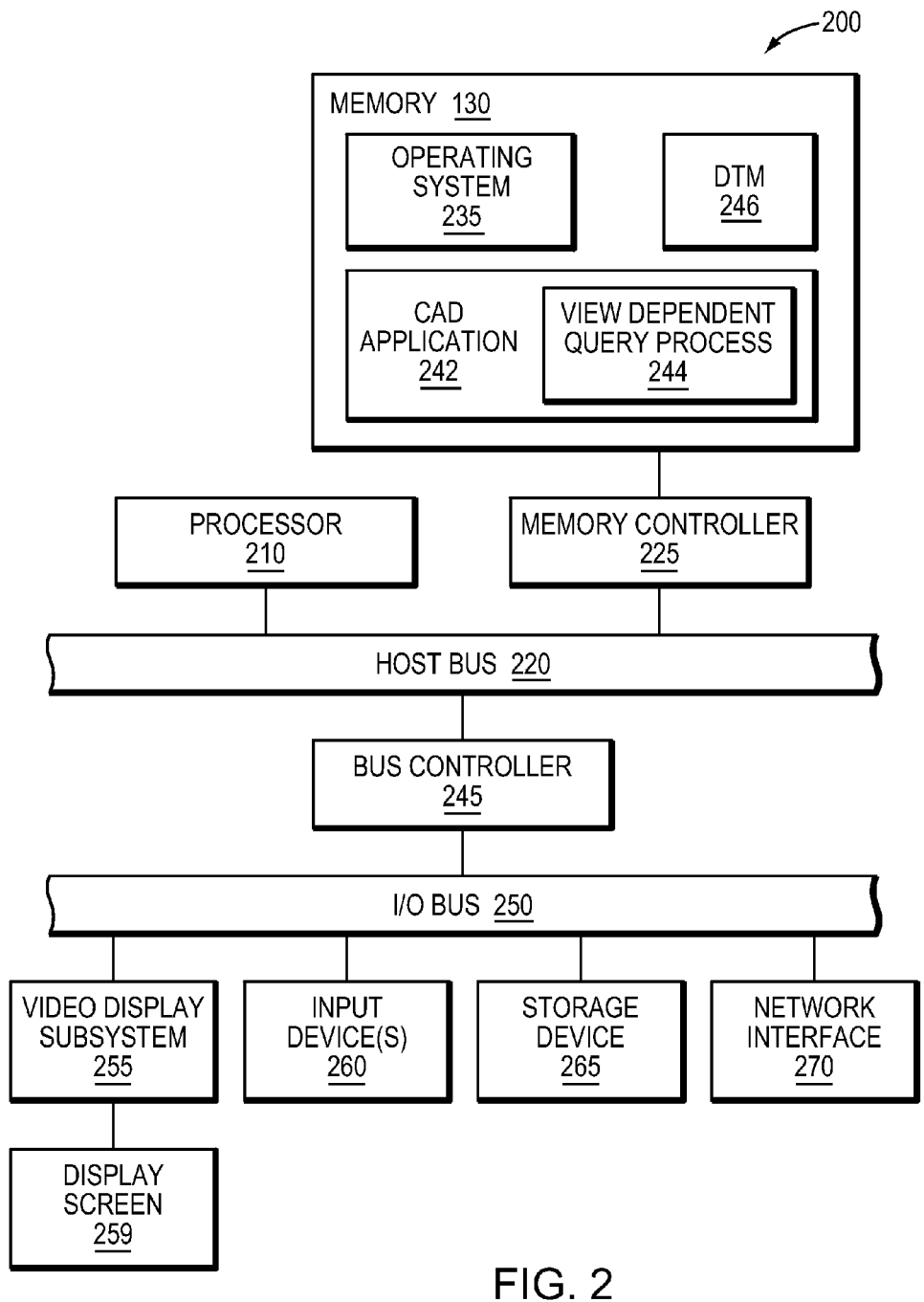
FIG. 2 is a schematic block diagram of an example electronic device (e.g., a computer)

FIG. 2 is a schematic block diagram of an example electronic device 200, (e.g. a computer), in which at least some of the presently described techniques may be employed. The electronic device 200 includes at least one processor 210 coupled to a host bus 220. The processor 210 may be any of a variety of commercially available processors, such as an Intel x86 processor, or another type of processor. A volatile memory 230, such as a Random Access Memory (RAM), is coupled to the host bus 220 via a memory controller 225. The memory 230 is configured to store at least a portion of computer-executable instructions and data for an operating system 235 while the electronic device 200 is operating. In addition, the memory 230 may store at least portions of computer-executable instructions for a CAD application 242 that may include a view dependent query process 244, as well as at least certain portions of a data set that describes the topography of a three-dimensional surface, such as a DTM 246.

The host bus 220 of the electronic device 200 is coupled to an input/output (I/O) bus 250 through a bus controller 245. A video display subsystem 255, which may include a display screen 257 and hardware to drive the display screen, is coupled to the I/O bus 250. The display screen, among other functions, may show a user interface of the CAD application 242. One or more input devices 260, such as a keyboard, mouse, a touchpad, etc., are provided and used for interaction with the electronic device 200, and the CAD application 242 executing on the electronic device. A persistent storage device 265, such as hard disk drive, a solid-state drive, or other type or persistent data store, is coupled to the I/O bus 250, and may persistently store computer-executable instructions and data, that are available to be loaded to the volatile memory 230 when needed. For example, computer-executable instructions and data for the operating system 235, and the CAD application 242 that includes a view dependent query process 244, as well as data for the data set (e.g., DTM) 246, may be stored in the persistent storage device 265. The I/O bus 250 may further be coupled to a network interface 270 that interfaces with a computer network (not shown). The computer network may allow communication between the electronic device 200 and other devices, using any of a number of well known networking protocols, including wireless networking protocols, to permit a variety of distributed, collaborative or remote computing configurations.

The above mentioned view dependent query process 244 may implement techniques to obtain data from a data set that describes the topography of a three-dimensional surface, such as DTM 246, at a resolution appropriate for visualization on the display screen 257. Data in the data set (e.g., DTM) may be organized into a number of resolutions by spatial indexing (to form a multi-resolution data set), where each node of a spatial index corresponds to a cluster of data of the data set at a corresponding resolution. In one embodiment, the view-dependent query process employs a generic approach. In alternative embodiments, a "camera-specific" approach may be employed that employs differing operations for affine visualizations and projective visualizations.

Figure 3:
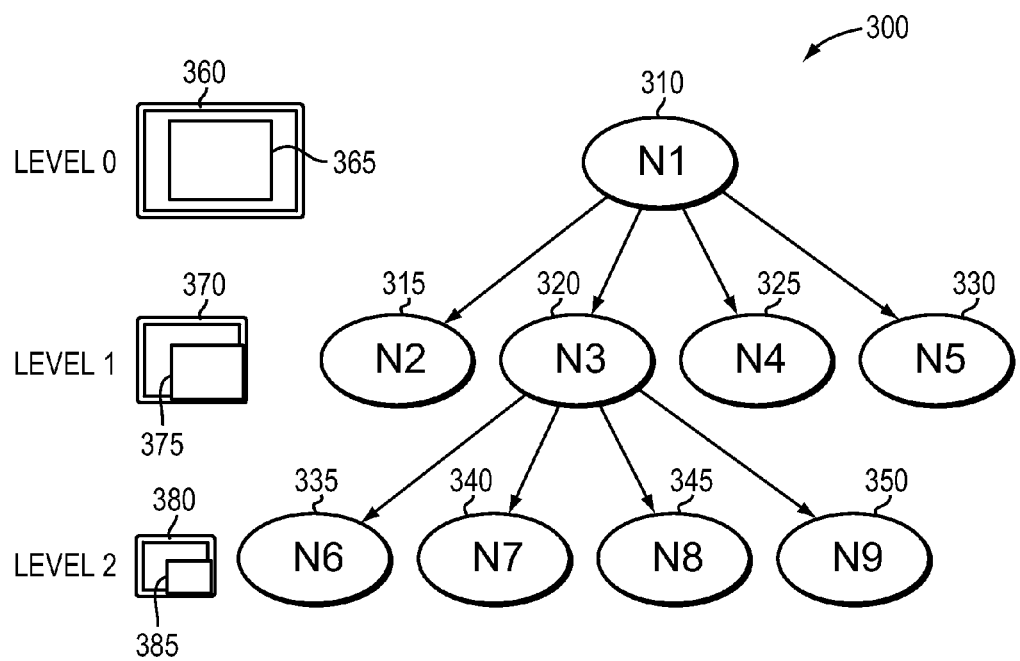
FIG. 3 is a diagram of an example spatial index that may organize the data of a data set that describes the topography of a three-dimensional surface (e.g., a DTM) into multiple resolutions.
Figure 3:
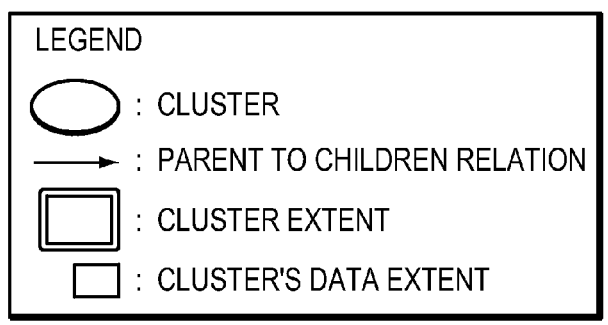

FIG. 3 is a diagram of an example spatial index 300 that may organize the data of a data set that describes the topography of a three-dimensional surface (e.g., a DTM) into multiple resolutions. The spatial index 300 may be maintained within the data set, for example within DTM 246, along with the underlying data, or, alternatively, separately maintained. While the spatial index 300 shown is a two-dimensional (2D) spatial index, specifically a quad-tree, it should be understood that a variety of other spatial indexing algorithms may alternatively be employed to organize the data of data set (e.g., DTM) into multiple resolutions in a variety of different manners. Further, while a single special index 300 is shown, it should be understood that, alternatively, multiple spatial indexes may be employed, for example, one spatial index per resolution.

Each node 310-350 of the spatial index 300 corresponds to a cluster of data (e.g., associated with a fixed area) of the data set at a corresponding resolution. The data may not fully fill the area of the cluster of data, and thus have a data extent that is less than the area of the respective cluster of data. For example, for the cluster of data that corresponds to node N1

310, the cluster's data extent 365 may fill only a portion (e.g. about ¼$^{th}$) the area 360 of the cluster of data represented by node N1 310.

A cluster of data may be further divided into a plurality (e.g., 4) sub-clusters that correspond to sub-portions of the area of the parent node. Each sub-portion is represented by a child node extending from the parent node, but including data for such sub-portion at a higher resolution than the parent node. Referring to the example in FIG. 3, child node N3 320 may correspond to sub-portion 370 that is ¼$^{th}$ of the area 360 represented by parent node N1 310. As with parent node N1 310, the data may not fully fill the area of the cluster of data, for example cluster's data extent 375 may fill only a portion (e.g. about ¼$^{th}$) the area 370 of the cluster of data represented by node N3 320

The pattern may continue, with child nodes serving as parent nodes themselves. For example, child node N8 345 may correspond to sub-portion 380 that is ¼$^{th}$ of the area of the area 370 represented by parent node N3 320. The cluster's data extent 385 may only cover a portion of to sub-portion 380. In such manner, the data set (e.g., DTM) may be structured as a multi-resolution data set (e.g., a multi-resolution DTM).

Figure 4:
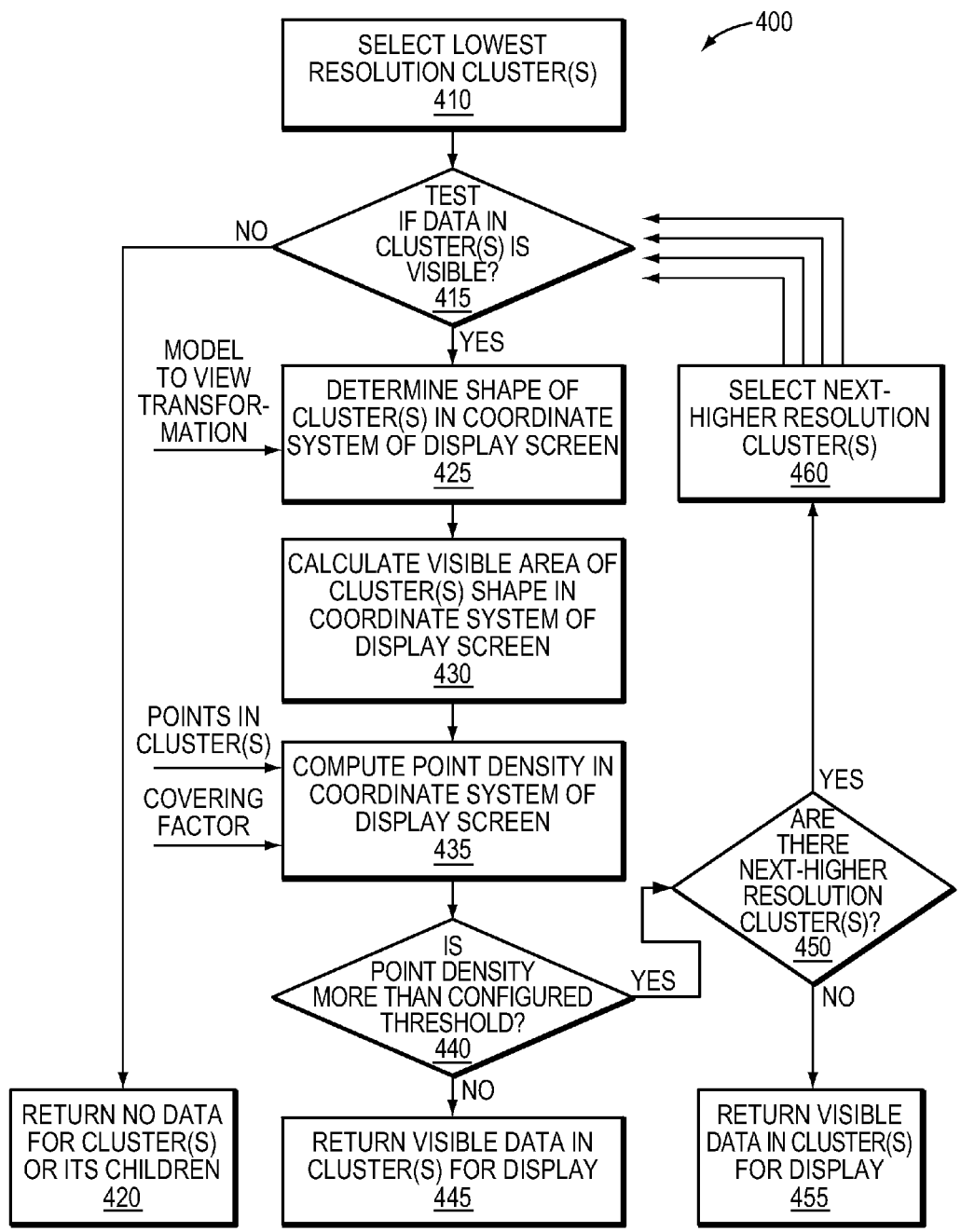
FIG. 4 is a flow diagram of an example generic algorithm that may be implemented by a view dependent query process to obtained data from a multi-resolution data set (e.g., a multi-resolution DTM) at a resolution appropriate for visualization on a display screen.

FIG. 4 is a flow diagram of an example generic algorithm 400 that may be implemented by a view dependent query process 244 to obtained data from a multi-resolution data set (e.g., a multi-resolution DTM) at a resolution appropriate for visualization on the display screen 257. The generic algorithm 400 may be applicable to both affine visualizations (i.e., visualizations depicted with no perspective effects such that objects are discoplayed at the same size and form on the display screen 257 regardless of their position) as well as projective visualizations (i.e., visualizations depicted with perspective effects such that objects are displayed with different sizes and forms on the display screen 257 depending on their position). At step 410, a spatial index for the multi-resolution data set (e.g., multi-resolution DTM) is accessed, and the lowest resolution cluster(s) of data are selected. For example, referring to FIG. 3, the cluster of data represented as node N1 310 may be selected. It should be understood that in alternative embodiments, where different spatial indexing techniques are employed, there may be more than one lowest resolution cluster of data, and, in such alternative embodiments, multiple lowest resolution clusters of data may be selected in step 410, and utilized in the remaining steps as appropriate.

At step 415, a test is performed to see if there is data in the selected cluster(s) of data that would be visible in a type of visualization requested by the CAD application 242. If there is no data in the selected cluster(s) of data that would be visible, execution proceeds to step 420 where the sequence of steps ends, and no data is returned for the cluster of data or its children (including successive level children). For example, referring to FIG. 3, no data is returned from the cluster of data represented as node N1 310, or its successive level children represented as nodes N2-N9 315-350. If there is data in the selected cluster(s) of data that would be visible in a type of visualization requested by the CAD application 242, execution proceeds to step 425, where the shape of the selected cluster(s) of data in the coordinate system of the display screen (i.e., in "view coordinates") is determined. Such determination may be made, for example, using a model-to-view transformation matrix that transforms each point that defines the shape of the cluster of data in the coordinate system of the data set (e.g., in the DTM's coordinate system) into points in the coordinate system of the display screen (i.e., in a "view coordinate system"). One example model-to-view transformation may be mathematically represented as:

$$N = T_m[0,3]*X_m + T_m[1,3]*Y_m + T_m[2,3]*Z_m + T_m[3,3]$$

$$X_v = (T_m[0,0]*X_m + T_m[1,0]*Y_m + T_m[2,0]*Z_m + T_m[3,0])/N$$

$$Y_v = (T_m[0,1]*X_m + T_m[1,1]*Y_m + T_m[2,1]*Z_m + T_m[3,1])/N$$

where N is a normalization factored, $T_m$ is a transformation matrix, $X_m$, $Y_m$, and $Z_m$ are x-axis, y-axis and z-axis coordinates of a point that defines a cluster of data's shape in the data set's (e.g., DTM's) coordinate system, and $X_v$ and $Y_v$ are x-axis and y-axis coordinates of a point that defines the cluster of data's shape in the display screen's coordinate system (i.e., in the "view coordinate system"). While the transformation matrix, $T_m$, may be a simple 4×4 transformation matrix, in alternative embodiments, the transformation matrix may be far more complex, for instance, to enable on-the-fly reprojection between two different geographic coordinate systems, or other complex transformations. In cases where the transformation matrix is projective, the shape of the cluster of data should be intersected with the projective plane defined by the transformation matrix, An equation for the projective plane may be defined, for example, as:

$$T_m[0,3]*X + T_m[1,3]*Ym + T_m[2,3]*Z + T_m[3,3] = 0$$

with the terms the same as defined above. If the shape of the cluster of data intersects the projective plane, the region of the shape of the cluster of data in front of the projective plane is used to calculate the area of the shape of the cluster of data in the display screen's coordinate system (i.e., the "view coordinate system"). Since the display screen 257 is typically two-dimensional, the display screen's coordinate system (i.e., the "view coordinate system") typically lacks a z-axis coordinate, $Z_v$, and therefore there is no need to compute one. Also, depending on the implementation, the equations may be further simplified. For example, if the spatial index for the data set (e.g., DTM), is a 2D spatial index, such as the quad-tree shown in FIG. 3, the z-axis coordinate $Z_m$ in the data set's (e.g. DTM's) coordinate system is typically a constant, e.g., 0, which further simplifies the equations.

After step 425, execution proceeds to step 430, where the visible area, $A_v$, of the selected cluster(s) of data in the display screen's coordinate system (i.e., in the "view coordinate system") is calculated given the shape. This may be performed using basic geometry area functions. Then, at step 435, a point density is computed in the display screen's coordinate system (i.e., in the "view coordinate system") for representing the visible data. For example, a number of display screen pixels per point in the visible data may be calculated, using a formula such as:

$$D_v = A_v / N_p * F_d * F_p$$

where $A_v$ is the visible area of a cluster of data in the display screen's coordinate system (i.e. "view coordinate system"), $N_p$ is a number of points in the cluster of data, $F_d$ is a factor (e.g., between 0 and 1) representing the area covered by the data set (e.g., DTM) in the cluster of data, $F_p$ is a ratio between the area of the region of the cluster shape that falls in front of any projective plane and the area of the of the cluster shape, and $D_v$ is the point density in the display screen's coordinate system (i.e. in the "view coordinate system") for representing the visible data (e.g., $D_v$ is a number display screen pixels per point).

Next, at step 440, the point density in the display screen's coordinate system (i.e., the "view coordinate system") is compared to a configured threshold. The configured threshold may be set by, and potentially changed on-the-fly by, the CAD application 242 to increase or decrease the density. Typically, the configured threshold should be greater than one. In one embodiment, the configured threshold is a value between 4 and 1000.

If the point density in the display screen's coordinate system (i.e., in the "view coordinate system") is less than or equal to the configured threshold for a selected cluster of data, then execution proceed to step 445 for that cluster data, where the visible data of that cluster is returned for eventual display. For example, referring to FIG. 3, where the selected cluster of data is represented as node N1 310, the data associated with node N1 310 is returned. If the point density in the display screen's coordinate system (i.e., in the "view coordinate system") is more than the configured threshold for a selected cluster of data, then execution proceeds to step 450 for that cluster of data, where a determination is made whether there are one or more next-higher resolution clusters of data in the spatial index covering the area of that cluster of data. For example, referring to FIG. 3, if the lowest resolution cluster of data corresponding to node N1 310 is the selected cluster of data, there are four next-higher resolution clusters of data represented as nodes N2 315, N3 320, N4 325, and N5 330 in existence that cover its area, so, if the density is more than the configured threshold, execution would proceed to step 460. If there is not one or more next-higher resolution clusters of data in the spatial index covering the area of the selected cluster of data, execution would instead proceed to step 455

If execution proceeds to step 455, the visible data in the selected cluster(s) of data is returned for eventual display on the display screen 257. On the other hand, if execution proceeds to step 460, then the one or more next-higher resolution clusters of data in the spatial index are selected. The sequence of steps 415-460 is then repeated, focusing on these selected next-higher resolution cluster(s) of data. For example, referring to FIG. 3, the four next-higher resolution clusters of data represented as nodes N2 315, N3 320, N4 325, and N5 330 may be subject to the sequence of steps. Each of the clusters of data represented as nodes N2 315, N3 320, N4 325, and N5 330 may not make it all the way through the sequence of steps. For instance, it is possible that only the cluster of data represented as node N3 320 has data that would be visible in a type of visualization requested by the CAD application 242. If so, only the cluster of data represented as node N3 320 would progress to step 425. Similarly, the density of the next-higher resolution cluster(s) may still be more than the configured threshold, and, as such, one or more still-next-higher resolution clusters of data in the spatial index may be selected at step 460, and the sequence of steps 415-460 repeated again. It should be understood that this cycle may continue until one of steps 420, 445, or 455 is reached for each selected cluster of data.

While the generic algorithm 400 may be advantageously employed to obtain data from a multi-resolution data set (e.g., multi-resolution DTM) at a resolution appropriate for visualization on the display screen 257, certain additional improvements may be made to it to, for example, to address certain resolution selection related artifacts which might not be acceptable for some applications. For instance, for two adjacent clusters of data, the generic algorithm 400 may, in some cases, return data at different resolutions for each cluster of data where the resolutions preferably should be identical. This issue may be addressed by an alternative "camera-specific" algorithm.

Figure 5:
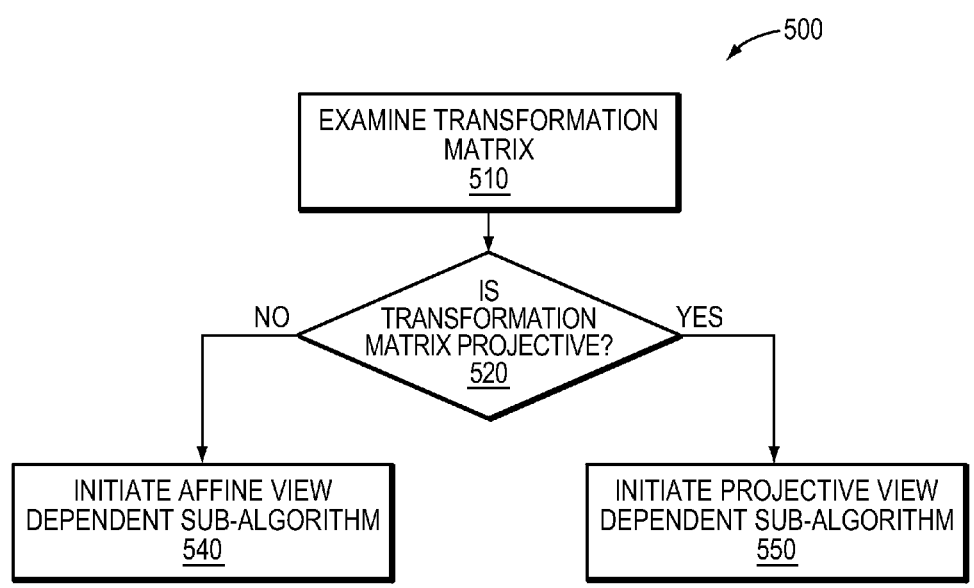
FIGS. 5-7 are flow diagrams of an example camera-specific algorithm that may be implemented by a view dependent query process to obtained data from a multi-resolution data set (e.g., a multi-resolution DTM) at a resolution appropriate for visualization on a display screen, that implements different operations if the data is visualized in an affine manner or a projective manner.
Figure 6:
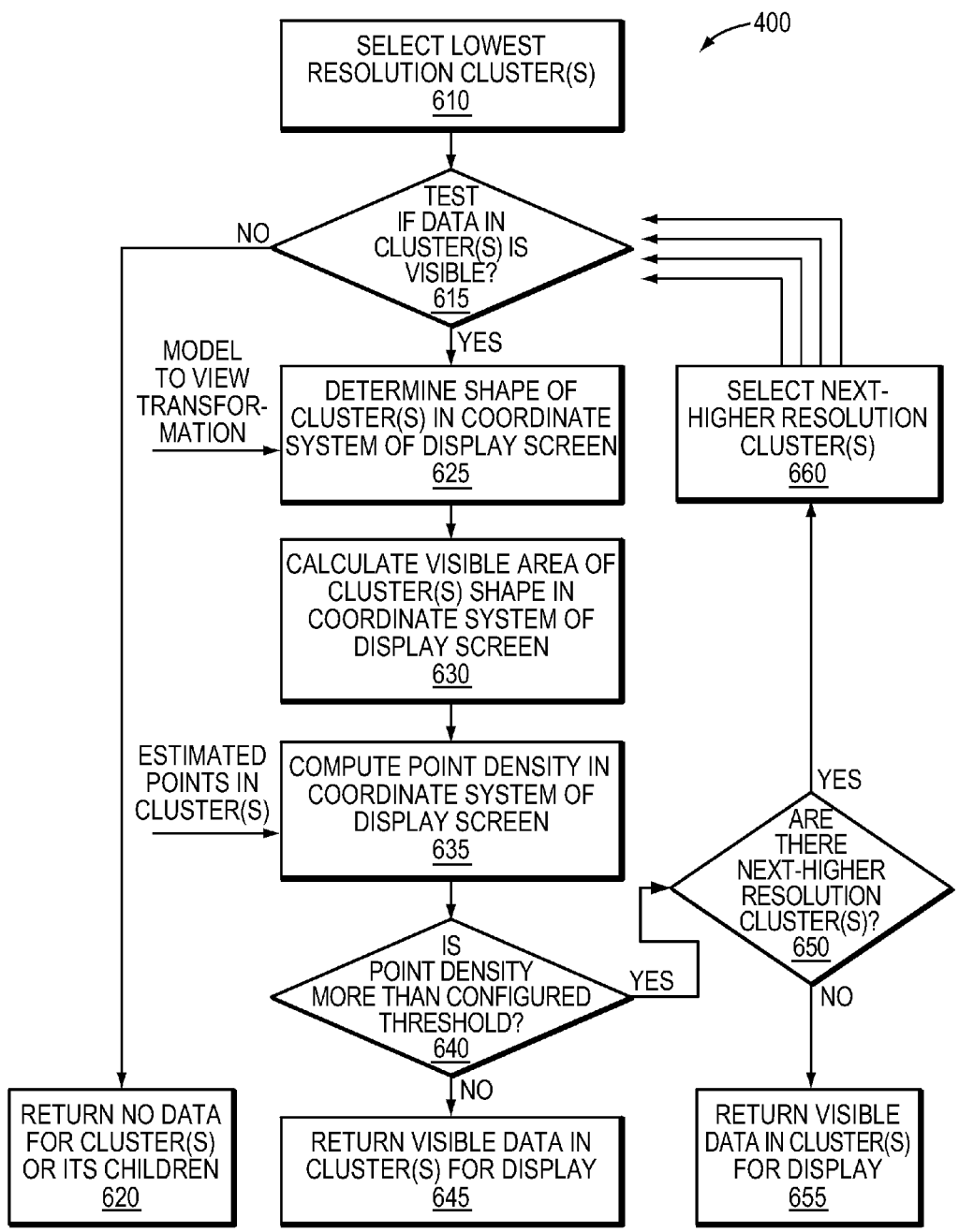
Figure 7:
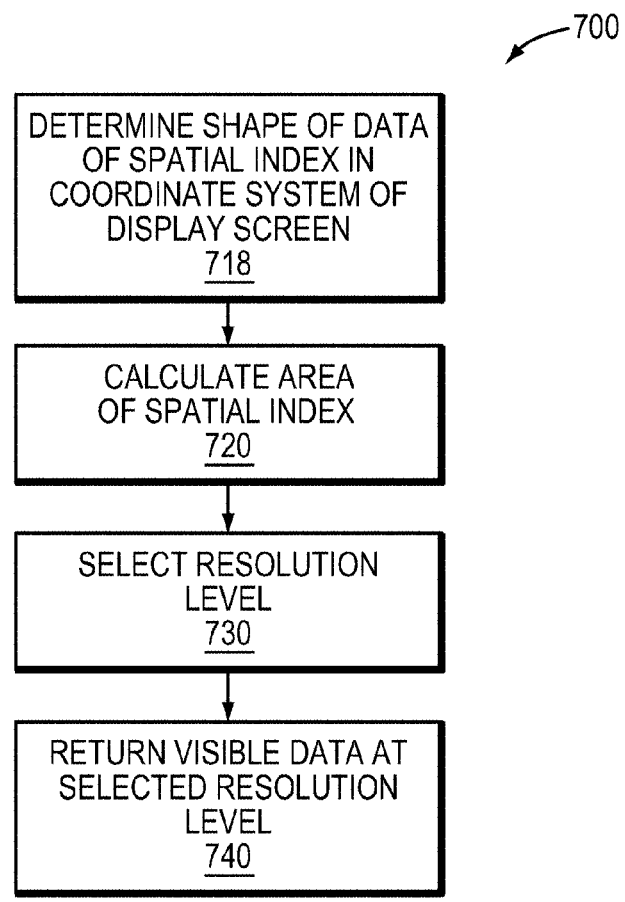

FIGS. 5-7 are flow diagrams of an example camera-specific algorithm that may be implemented by the view dependent query process 244 to obtained data from a multi-resolution data set (e.g., a multi-resolution DTM) at a resolution appropriate for visualization on the display screen 257, that implements different operations if the data is visualized in an affine manner or a projective manner. In FIG. 5, a sequence of steps 500 of the camera-specific algorithm determines if the CAD application 244 is requesting an affine view or a projective view, and initiates an appropriate sub-algorithm. Specifically, at step 510, the view dependent query process 244 examines the transformation matrix, e.g. $T_m$, that transforms each point that defines the shape of the cluster of data from the data set's coordinate system into the display screen's coordinate system (i.e., the "view coordinate system"). At step 520, a determination is made whether the transformation matrix is projective or affine. For example, a normalization factor (N in the example transformation $T_m$ discussed above) may be tested to see if it is always equal to 1. If the transformation matrix is projective (e.g., determined by the normalization factor not always being equal to 1), execution proceeds to step 550, where the projective view dependent sub-algorithm depicted in FIG. 6 is initiated by the view dependent query process 244. If the transformation matrix is affine (e.g., determined by the normalization factor always being equal to 1), execution proceeds to step 540, where the affine view dependent sub-algorithm depicted in FIG. 7 is initiated by the view dependent query process 244.

FIG. 6 details an example sequence of steps 600 of a projective view dependent sub-algorithm that may be implemented by the view dependent query process 244 to obtain data from a multi-resolution data set (e.g., a multi-resolution DTM) at a resolution appropriate for visualization on the display screen 257. The steps 610-660 of the projective view dependent sub-algorithm may be substantially identical to the steps 410-460 of the generic algorithm 400, with the exception of steps 625 and 635.

In step 625, the shape of the cluster of data is intersected with the projective plane defined by the transformation matrix, here a projective matrix, $T_m$. The equation for the projective plane may be defined by the projective matrix, for example, as:

$$T_m[0,3]*X+T_m[1,3]*Ym+T_m[2,3]*Z+T_m[3,3]=0$$

with the terms the same as defined above. If the shape of the cluster of data intersects the projective plane, the region of the shape of the cluster of data in front of the projective plane is used to calculate the area of the shape of the cluster of data in the display screen's coordinate system (i.e., the "view coordinate system").

In step 635, the point density in the display screen's coordinate system (i.e., the "view coordinate system") for representing the visible data is computed using an a differing function. For example, a number of display screen pixels per point in the visible data may be calculated, using the function:

$$D_v=A_v/E(N_p)$$

where $A_v$ is the visible area of the cluster of data in the display screen's coordinate system (i.e., the "view coordinate system"), $E(N_p)$ is a an estimated number of points in the cluster, and $D_v$ is the point density in the display screen's coordinate system (i.e., "view coordinate system") for representing the visible data (i.e., is a number display screen pixels per point). The absence of a factor, $F_a$, representing the area covered by the model (e.g. DTM) in the cluster of data may assist in suppressing resolution selection related artifacts. The estimated number of points, $E(N_p)$, may be estimated in a number of differing way, for example, depending on the type of spatial index employed. For a 2D spatial index, such as the spatial index 300 shown in FIG. 3, a "split threshold" may be examined, i.e., the maximum number of points a cluster of data represented by a node may be allowed to hold before it is "split" into sub-portions represented by child nodes. Alternatively, the estimated number of points, $E(N_p)$, may be estimated by determining maximum, minimum or mean numbers of points in nodes with no child nodes, or by other techniques appreciated by those skilled in the art.

FIG. 7 details an example sequence of steps 700 for an affine view dependent sub-algorithm that may be implemented by view dependent query process 244 to obtained data from a multi-resolution data set (e.g., multi-resolution DTM) at a resolution appropriate for visualization on the display screen 257. When there are no perspective effects, the same resolution may be chosen to avoid resolution selection related artifacts. At step 710, the shape of the data of the spatial index 300 is determined in the coordinate system of the display screen (i.e., in "view coordinates"). Such determination may be made, for example, using a model-to-view transformation matrix, such as the one discussed above in reference to step 435 of FIG. 4. At step 720, the area of the spatial index 300 in the display screen's coordinate system (i.e., in the "view coordinate system") is calculated given the shape, for example, using basic geometry area functions.

Execution proceeds to step 730 where a resolution level (represented as a level of the nodes in the spatial index) in the multi-resolution data set is selected. Such selection may be based, for example, upon a formula:

$$L=\log(A_v/N_c/E(N_p)*T)/\log(F_r)$$

where $A_v$ is the area of the spatial index in the display screen's coordinate system (i.e., in the "view coordinate system") given its shape, $N_c$ is the number of clusters of data at a lowest resolution level in the spatial index, $E(N_p)$ is an estimated number of points per cluster of data, T is a configured threshold in display screen's coordinate system (i.e., in the "view coordinate system") per point of the cluster of data, and $F_r$ is a fraction of the number of points at the resolution level to the number of points in an immediately lower resolution level, and L is the resolution level from which the data (points) in the spatial index is to be obtained. For a 2D spatial index, such as the spatial index 300 shown in FIG. 3, $N_c$ would equal one, since there is only one lowest resolution cluster of data, in FIG. 3 represented by node N1 310. Similarly, if the 2D spatial index is a quad-tree, $F_r$ would equal 4 (i.e., 75% of the points are removed at each lower level of resolution).

Finally, at step 740, the sequence ends and visible data in the clusters of data at the selected resolution level is returned for eventual display.

Figure 8:
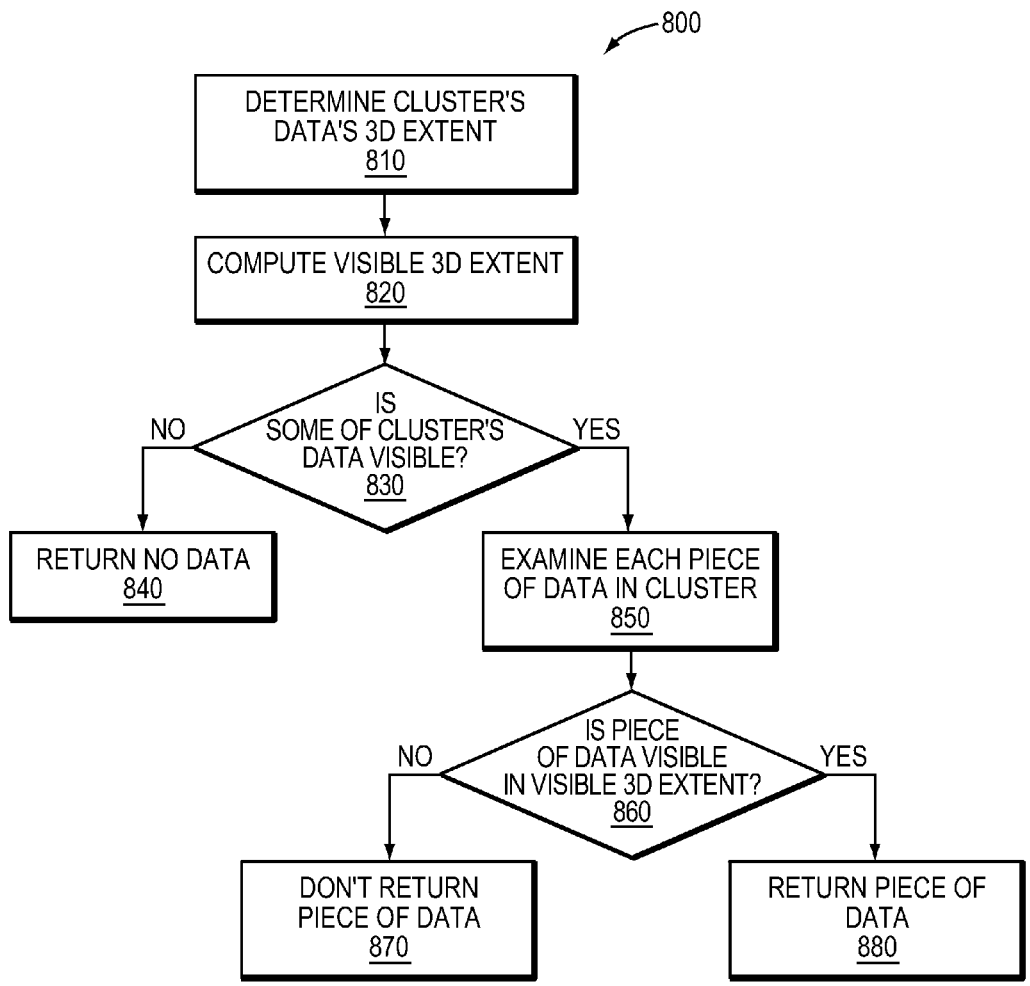
FIG. 8 is an example three-dimensional visibility algorithm that may be used to determine whether data in the cluster of data that would be visible.

Both the generic algorithm and the camera-specific algorithm determine whether there is data (points) in the cluster of data that would be visible in a type of visualization requested by the CAD application 242. FIG. 8 is an example three-dimensional visibility algorithm that may be used to determine whether points in the cluster of data that would be visible. The sequence of steps begins at step 810, where the three-dimensional extent is determined of the data of the cluster of data currently being examined. The data of the cluster of data currently being examined includes data that is inside the cluster of data's shape at a resolution level of the cluster of data, as well as data for all higher resolution levels. For example, for a spatial index having 5 resolution levels, 0 being the lowest resolution level, the three-dimensional extent of the data of the cluster of data at level 3 is determined by finding the minimum and maximum coordinates of all the data that is inside the cluster of data's shape at levels 3, 4 an 5 of the spatial index.

At step 820, using the three-dimensional extent of the data of the model (e.g. DTM) related to the cluster of data, a three-dimensional object representing the visible volume of the three-dimensional extent of is determined. From the visible three-dimensional extent, at step 830, it is determined if some of the date in the cluster is visible by determining is the three-dimensional extent is empty. If the three-dimensional extent is empty, and therefore, no data in the cluster of data are visible, execution proceed to step 840 where no data is returned. However, if the three-dimensional extent is not empty, execution proceeds to step 850 where a subsequence of steps begin to determine the visibility of each point in the data. At step 850, each point (piece of data) in the cluster of data is examined. At step 860, for each point (piece of data) visibility is determined by checking if it falls inside the visible three-dimensional extent. If the point (piece of data) is not visible it is not returned at step 870. If the point (piece of data) is visible it is returned at step 880.

While the above description discusses various embodiments of the present disclosure, it should be apparent that a number of modifications and/or additions may be made without departing from the disclosure's intended spirit and scope. It should be understood that the above described techniques may be implemented in software, in hardware, or a combination thereof. A software implementation may include executable instructions stored in a non-transitory computer-readable medium, such as a volatile or persistent memory device, a hard-disk, a compact disk (CD), etc. A hardware implementation may include processors, memory chips, programmable logic circuits, application specific integrated circuits, and/or other types of hardware components. Further, a combined software/hardware implementation may include both computer-executable instructions stored in a non-transitory computer-readable medium, as well as one or more hardware components. Accordingly, it should be understood that the above descriptions are meant to be taken only by way of example.

What is claimed is:

1. A method for obtaining data, from a data set that describes the topography of a three-dimensional surface at points, at a resolution appropriate for visualization on a display screen of an electronic device, comprising:

organizing data of the data set into a number of resolutions by spatial indexing, a spatial index having a plurality of nodes, where each node of the spatial index represents a cluster of data of the data set at a corresponding resolution that includes a set of the points;

selecting a lowest resolution cluster of data from the spatial index;

calculating a point density in a coordinate system of the display screen resulting from data at the resolution of the selected cluster of data, wherein the point density is calculated as a number of display screen pixels per point of the cluster of data;

for any visible data in the selected cluster of data for a type of visualization to be shown on the display screen, comparing the point density in the display screen's coordinate system to a configured threshold;

if the point density in the display screen's coordinate system is below the configured threshold, considering the visible data in the selected cluster of data is at a resolution appropriate for visualization, and returning the visible data in the selected cluster of data for display on the display screen; and if the point density in the display screen's coordinate system is above the configured threshold, selecting one or more next-higher resolution clusters of data from the spatial index, and repeating the calculating, comparing and the considering and returning, or the selecting one or more next-higher resolution clusters, as the case may be, for the one or more next-higher resolution clusters of data.

2. The method of claim 1, wherein the data set is a digital terrain model (DTM) and the three-dimensional surface is terrain, wherein the DTM represents topology of the terrain using elevation measurements at the points.

3. The method of claim 1, further comprising:
performing a test to determine if there is any visible data in the selected cluster of data for a type of visualization to be shown on the display screen.

4. The method of claim 3, further comprising:
if there is no visible data in the selected cluster of data for the type of visualization to be shown on the display screen, returning no data for the selected cluster of data.

5. The method of claim 1, further comprising:
determining a shape of the visible data in the selected cluster of data in the coordinate system of the display screen.

6. The method of claim 5, wherein the determining a shape further comprises:
using a model-to-view transformation that transforms each point of the selected cluster of data from a coordinate system of the data set into a point in the coordinate system of the display screen, the point in the coordinate system of the display screen to be represented by one or more pixels on the display screen.

7. The method of claim 1, further comprising:
determining if the visualization to be shown on the display screen includes a projective view or an affine view.

8. The method of claim 7, further comprising:
if the visualization to be shown on the display screen includes a projective view, executing a projective view dependent sub-algorithm that comprises the executing, the selecting a lowest resolution cluster of data, the calculating, the comparing, the returning, and the selecting one or more next-higher resolution clusters of data; and
if the visualization to be shown on the display screen includes an affine view, executing an affine view dependent sub-algorithm.

9. The method of claim 8, wherein the affine view dependent sub-algorithm comprises:
determining a shape of the data of the data set;
determining a visible area of the data of the data set in a coordinate system of the display screen;
selecting a resolution of the data in the spatial index; and
returning visible data at the resolution for display on the display screen.

10. The method of claim 1, wherein the electronic device is a computer and the method further comprises:
executing the selecting a lowest resolution cluster of data, the computing, the comparing, the returning, and the selecting one or more next-higher resolution clusters of data by a processor of the computer.

11. An apparatus to obtain data from a data set that describes the topography of a three-dimensional surface at a resolution appropriate for visualization, comprising:
a display screen configured to display a visualization;
a processor; and
a memory coupled to the processor and configured to store a spatial index that organizes data of the data set into a number of resolutions, where each node of the spatial index represents a cluster of data of the data set at a corresponding resolution that includes a set of points, and to store instructions for a view dependent query process that are executable on the processor, the instructions for the view dependent query process, when executed, operable to:
select a lowest resolution cluster of data from the spatial index,
calculate a point density in a coordinate system of the display screen resulting from data at the resolution of the selected cluster of data, wherein the point density is calculated as a number of display screen pixels per point of the cluster of data,
for any visible data in the selected cluster of data for a type of visualization to be shown on the display screen, compare the point density in the display screen's coordinate system to a configured threshold,
if the point density in the display screen's coordinate system is below the configured threshold, consider the visible data in the selected cluster of data is at a resolution appropriate for visualization, and return the visible data in the selected cluster of data for display on the display screen, and
if the point density in the display screen's coordinate system is above the configured threshold, select one or more next-higher resolution clusters of data from the spatial index, and repeat the calculation, comparison and the consideration and return, or the selection of one or more next-higher resolution clusters, as the case may be, for the one or more next-higher resolution clusters of data.

12. The apparatus of claim 11, wherein the data set is a digital terrain model (DTM) and the three-dimensional surface is terrain, wherein the DTM represents topology of the terrain using elevation measurements at the discrete points.

13. The apparatus of claim 11, wherein the instructions for the view dependent query process, when executed, are further operable to:
perform a test to determine if there is any visible data in the selected cluster of data for a type of visualization to be shown on the display screen.

14. The apparatus of claim 13, wherein the instructions for the view dependent query process, when executed, are further operable to:
if there is no visible data in the selected cluster of data for a type of visualization to be shown on the display screen, return no data for the selected cluster of data.

15. The apparatus of claim 11, wherein the instructions for the view dependent query process, when executed, are further operable to:
determine a shape of the visible data in the selected cluster of data in the coordinate system of the display screen.

16. The apparatus of claim 15, wherein the instructions for the view dependent query process, when executed, are further operable to:

use a model-to-view transformation that transforms each point of the selected cluster of data from a coordinate system of the data set into a point in the coordinate system of the display screen, the point in the coordinate system of the display screen to be represented by one or more pixels on the display screen.

17. A non-transitory computer-readable medium that includes instructions executable on a processor, the instructions, when executed, operable to:

select a lowest resolution cluster of data from a spatial index, the spatial index having a plurality of nodes, where each node of the spatial index represents a cluster of data of the data set at a corresponding resolution and includes a set of the points;

calculate a point density in a coordinate system of a display screen resulting from data at the resolution of the selected cluster of data, wherein the point density is calculated as a number of display screen pixels per point of the cluster of data;

for any visible data in the selected cluster of data for a type of visualization to be shown on the display screen, compare the point density in the display screen's coordinate system to a configured threshold;

if the point density in the display screen's coordinate system is below the configured threshold, considering the visible data in the selected cluster of data is visualizable, and return the visible data in the selected cluster of data for display on the display screen; and if the point density in the display screen's coordinate system is above the configured threshold, select one or more next-higher resolution clusters of data from the spatial index, and repeat the calculation, comparison and the consideration and return, or the selection of one or more next-higher resolution clusters, as the case may be, for the one or more next-higher resolution clusters of data.

18. The non-transitory computer-readable medium of claim 17 wherein the data set is a digital terrain model (DTM), wherein the DTM represents topology of terrain using the points.

* * * * *

UNITED STATES PATENT AND TRADEMARK OFFICE
CERTIFICATE OF CORRECTION

PATENT NO. : 9,454,554 B1
APPLICATION NO. : 13/106600
DATED : September 27, 2016
INVENTOR(S) : Mathieu St-Pierre It is certified that error appears in the above-identified patent and that said Letters Patent is hereby corrected as shown below:

In the Specification

Column 5, Line 32 reads:
that objects are disco played at the same size and form on the Should read:
that objects are displayed at the same size and form on the Signed and Sealed this
Twenty-third Day of May, 2017

Michelle K. Lee
*Director of the United States Patent and Trademark Office*